(12) United States Patent
Park et al.

(10) Patent No.: US 7,058,361 B2
(45) Date of Patent: Jun. 6, 2006

(54) CHANNEL COMPENSATING APPARATUS AND METHOD THEREOF FOR MOBILE COMMUNICATION TERMINAL

(75) Inventors: Tan-Joong Park, Kyungko-Do (KR); Hun-Geun Song, Incheon (KR)

(73) Assignee: LG Electronics Inc., Seoul (KR)

( * ) Notice: Subject to any disclaimer, the term of this patent is extended or adjusted under 35 U.S.C. 154(b) by 458 days.

(21) Appl. No.: 10/330,548

(22) Filed: Dec. 30, 2002
(Under 37 CFR 1.47)

(65) Prior Publication Data

US 2004/0023662 A1 Feb. 5, 2004

(30) Foreign Application Priority Data

Dec. 31, 2001 (KR) .................. 10-2001-0089268
Dec. 4, 2002 (KR) .................. 10-2002-0076669

(51) Int. Cl.
*H04B 1/00* (2006.01)
(52) U.S. Cl. ........... 455/63.1; 455/67.11; 455/67.13; 455/452.2; 455/522; 455/550.1
(58) Field of Classification Search ........... 455/452.1, 455/452.2, 63.1, 67.13, 522, 550.1
See application file for complete search history.

(56) References Cited

U.S. PATENT DOCUMENTS

| | | | |
|---|---|---|---|
| 5,513,221 A * | 4/1996 | Parr et al. .................. 375/344 |
| 6,219,561 B1 * | 4/2001 | Raleigh ..................... 455/561 |
| 6,493,379 B1 * | 12/2002 | Tanaka et al. .............. 375/150 |
| 6,563,810 B1 * | 5/2003 | Corazza ..................... 370/335 |
| 2002/0003833 A1 * | 1/2002 | Usuda et al. ............... 375/144 |
| 2002/0115464 A1 * | 8/2002 | Hwang et al. ............. 455/522 |
| 2002/0191569 A1 * | 12/2002 | Sung et al. ................ 370/335 |
| 2003/0072396 A1 * | 4/2003 | Binshtok et al. ........... 375/346 |

* cited by examiner

*Primary Examiner*—George Eng
*Assistant Examiner*—Dai Phuong
(74) *Attorney, Agent, or Firm*—Fleshner & Kim LLP

(57) ABSTRACT

A method and apparatus for performing channel compensating in a mobile communication terminal calculates a channel prediction value by varying an energy cumulative interval based on channel variation occurring in a radio channel. In accordance with one illustrative embodiment, the energy cumulative interval is varied from a minimum 2T to a maximum 6T according to a traveling speed of a terminal. As a result of this compensation, channel prediction error is reduced. And accordingly more accurate channel compensation is performed.

26 Claims, 4 Drawing Sheets

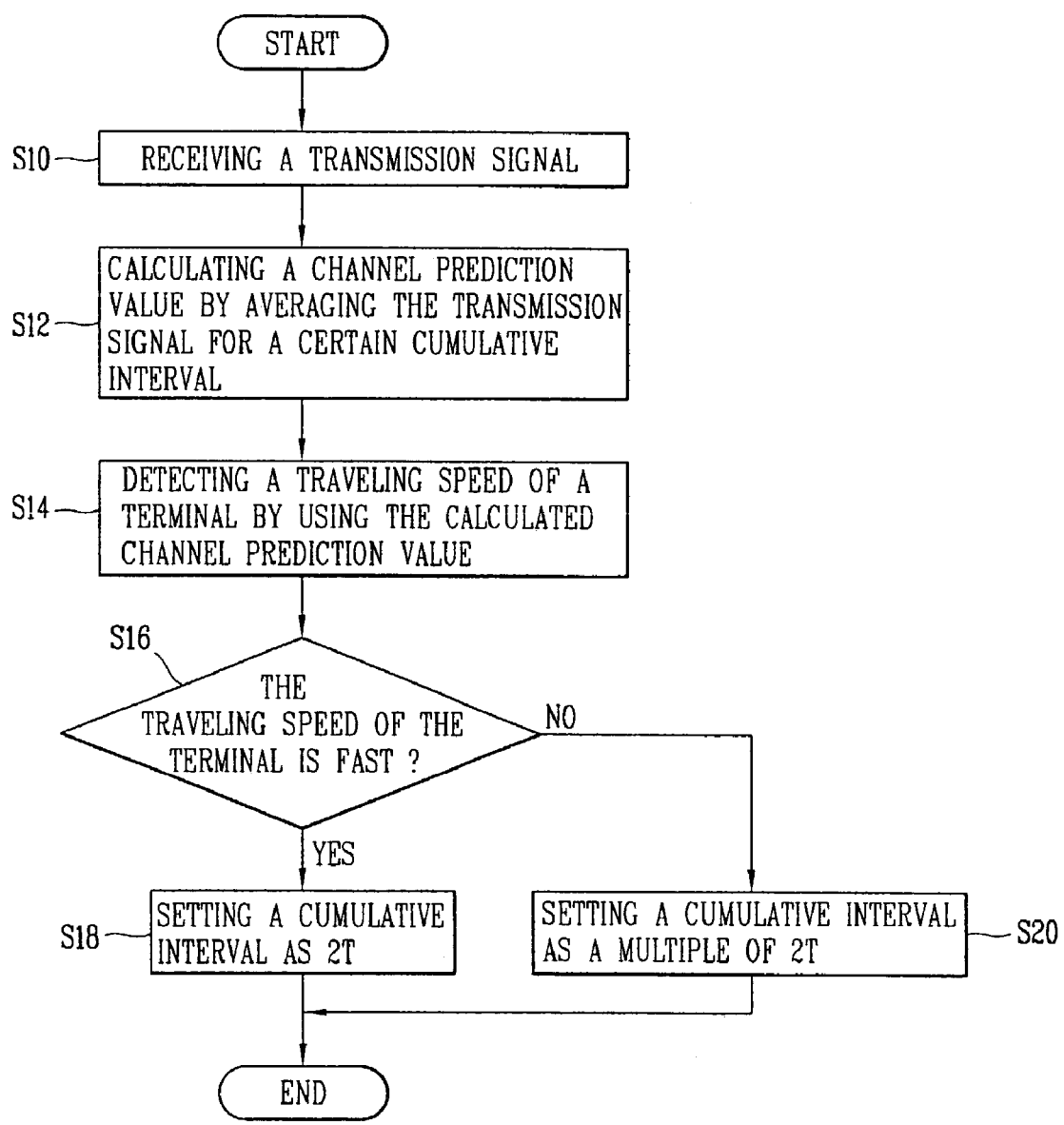

CHANNEL COMPENSATING APPARATUS AND METHOD THEREOF FOR MOBILE COMMUNICATION TERMINAL

BACKGROUND OF THE INVENTION

1. Field of the Invention

The present invention generally relates to a mobile communication system, and in particular to an apparatus and method for performing channel compensation in a mobile communication system.

2. Background of the Related Art

Broadband mobile communication systems use STTD (space-time transmit diversity) as a method for increasing forward capacity. In this method, two symbols output from a modulation block are converted through time-space coding so as to have the same information but cross each other. The two symbols are then respectively transmitted to two antennas, and the transmitted symbols are demodulated by compensating channel phase distortion of signals passing different radio channel paths by antennas in a rake receiver of a mobile station. In demodulating the received signal, it is important to accurately predict channel phase distortion of the signal passing through each channel path, because the prediction accuracy affects the performance of the whole system.

In order to predict channel phase distortion, a base station transmits data with a pilot signal as a pre-appointed data pattern, and the mobile station receives the pilot signal and extracts channel distortion information.

FIG. 1 is a block diagram illustrating a rake receiver of a broadband mobile communication system in accordance with the conventional art. This receiver includes a descrambler 4 for descrambling a signal received through an antenna using a scrambling code, a reverse channelizer 5 for dividing an output signal of the descrambler 4 by channels using a spreading factor, a channel predictive unit 6 for predicting phase distortion of each channel from the output signal of the descrambler 4, and a demodulator 7 which compensates for channel distortion of an output signal of the reverse channilizer 5 based on the phase distortion output from the channel predictive unit.

Operation of the conventional rake receiver will now be described. A forward link signal transmitted from the base station is allocated to each finger of the rake receiver. The allocated signal is synchronized with each multi-pass position output from a cell seeker (not shown) and is correlated by symbol units using a scrambling code and spreading factor. More specifically, the descrambler 4 descrambles the received signal using the scrambling code output from a code generator (not shown). The reverse-channelizer 50 divides the output signal of the descrambler 4 by channels with the spreading factor output from the code generator (not shown), and the channel predictive unit 6 predicts a channel phase distortion value of each channel (antenna 1 and antenna 2) from the output signal of the descrambler.

The demodulator 7 compensates the phase distortion (channel path distortion) of the output signal of the reverse-channelizer based on the channel phase distortion value output from the channel predictive unit, decodes it, and outputs a symbol signal.

FIG. 2 illustrates the channel predictive unit of the rake receiver shown in FIG. 1. As Shown, the channel predictive unit includes a first antenna mixer 10 for multiplying a scrambling code (Csc) by a signal input through the finger and dividing the signal into I and Q signals, an I-channel processor 12 for processing the I signal output from the mixer 10 and generating a channel phase distortion value for the I channel, and a Q-channel processor 14 for processing the Q signal output from the mixer 10 and generating a channel phase distortion value for the Q-channel. The channel prediction unit further includes a second antenna mixer 20 for multiplying the scrambling code (Csc) by a signal received through the finger and dividing the signal into I and Q signals, an I-channel processor 22 for processing the I signal output from the mixer 20 and generating a channel phase distortion value about the I-channel, a Q channel processor 24 for processing the Q signal output from the mixer 10 and generating a channel phase distortion value about the Q channel. Herein, the I channel processor 22 and the Q channel processor 24 for antenna 2 each include a mixer for performing a mixing operation based on a symbol pattern A, however the operation of the rake receiver is not much effected by that.

For convenience purposes, operation of only the I-channel processor 12 will be described.

First, a signal received through the finger (Ri and i are fingers) is divided into an I signal and a Q signal in mixer 10, and the I signal and the Q signal are transmitted to the I channel processor 12 and the Q channel processor 14, respectively. Mixers 50, 60 of the I and Q channel processors respectively multiply the I and Q signal by a channelizing code (Cch) in order to divide the signals by channels, and adders 52, 62 respectively divide the channelized signals into channels having the same phase.

However, as depicted in FIG. 3, a symbol pattern group output from antenna 1 and antenna 2 of the transmission block (base station) consists of 4 symbols per each frame. In this case, "A" means 1 symbol and it is maintained for 256 chip. Accordingly, accumulators 54, 64 respectively accumulate each output signal of the adders 52, 62 for 4T (T=1 symbol cycle), calculate a moving average, and output a channel phase distortion value for the I channel and the Q channel of antenna 1. Here, it is assumed there is no channel variation for 4T. The same operation is applied to the I channel processor 22 and the Q channel processor 24 of antenna 2.

In the conventional art rake receiver, by accumulating-adding a channel signal allocated to each finger in a certain interval (4T), a channel phase distortion value for the antennas 1, 2 is output. In general, a fading phenomenon is affected by a natural phenomenon and artificial constructions. It occurs on transmission paths varied every time interval. In addition, when a mobile communication terminal is moved between base stations, a frequency of a radio wave proceeding to the front increases, and a frequency of a radio wave proceeding to the rear decreases by the Doppler effect. This fading phenomenon means that reception-level variation caused by amplitude and phase distortion of a radio wave occurs in reception and combination thereof, and this lowers transmission quality.

For example, when a terminal is in a hand over state, a signal allocated to each finger has a different Doppler frequency according to a location of a base station. Accordingly, each signal has a different phase and amplitude. In addition, when the mobile communication terminal is moved between the base stations, a transmission signal is transmitted to each finger through independent multiple paths different from each other.

In order to improve transmission quality of a terminal, the fading phenomenon and Doppler frequency have to be compensated for by performing channel prediction differently based on a traveling speed of a terminal, a location of a base station, and multiple paths. However, in the conventional art, by calculating a channel distortion value by only calculating a moving average for a fixed interval (4T) in each finger regardless of the traveling speed of a terminal, there may be an error in a channel size distortion value and a channel phase distortion value. Accordingly, the performance of the terminal may be lowered using the conventional art method.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention to provide a channel compensating apparatus and a method thereof for a mobile communication terminal which performs channel compensation adaptively based on the Doppler characteristics of a terminal.

Another object of the present invention is to provide a channel compensating apparatus and a method thereof for a mobile communication terminal which reduces channel prediction error using a variable channel prediction interval based on a radio channel variation.

Another object of the present invention is to provide a channel compensating apparatus and a method thereof for a mobile communication terminal which performs a channel prediction adaptively based on a traveling speed of a terminal.

In order to achieve these and objects, a channel compensating method for a mobile communication terminal in accordance with the present invention includes descrambling a received signal; dividing the descrambled signal by channels; calculating a channel prediction value by processing the descrambled signal; detecting variation of a radio channel by monitoring the calculated channel prediction value and compensating the channel prediction value according to the detected variation of the radio channel; and compensating the signal divided by channels by using the compensated channel prediction value.

The channel prediction value compensating step includes the sub-steps of counting variation of the channel prediction value for a certain time; checking whether the count value is less than a reference value; lengthening an energy cumulative interval for calculating the channel prediction value when the count value is less than the reference value, and shortening an energy cumulative interval for calculating the channel prediction value when the count value is greater than the reference value.

The energy cumulative interval is set as a multiple of 2T (maximum 6T) when the count value is less than the reference value, and the energy cumulative interval is set as 2T when the count value is greater than the reference value.

In order to achieve the above-mentioned objects, a channel compensating method for a mobile communication terminal in accordance with the present invention includes receiving a transmission signal; converting the transmission signal into a channel signal, computing a moving average of the channel signal for a certain cumulative interval and calculating a channel prediction value; detecting a traveling speed of a terminal on the basis of the calculated channel prediction value; and varying the cumulative interval according to the detected traveling speed of the terminal.

The cumulative interval is adaptively set from minimum 2T to maximum 6T according to a traveling speed of the terminal, the cumulative interval is set as a multiple of 2T when a traveling speed of the terminal is slow, and the cumulative interval is set as 2T when a traveling speed of the terminal is fast.

In order to achieve the above-mentioned objects, a channel compensating apparatus for a mobile communication terminal in accordance with the present invention includes a dechannelizer for dividing a descrambled received signal by channels; a channel predictive unit for calculating a channel prediction value by processing the descrambled received signal; a channel predictive controller for detecting variation of a radio channel by monitoring the calculated channel prediction value and compensating the channel prediction value according to the detected variation of the radio channel; and a demodulator for compensating channel path distortion about the signal divided by channels by using the channel prediction value outputted from the channel predictive unit.

The channel predictive controller shortens the energy cumulative interval when the count value is greater than a reference value and lengthens the energy cumulative interval when the count value is less than the reference value.

In order to achieve the above-mentioned objects, a channel predictive unit for a mobile communication terminal in accordance with the present invention includes a mixer for dividing a transmission signal received through a finger into channel signals; a channel processor for generating a channel phase distortion value by computing a moving average of the divided channel signal for a certain cumulative interval; and a Doppler speed detector for controlling the cumulative interval by detecting a traveling speed of a terminal on the basis of the channel phase distortion value of the channel processor.

The channel processor is an I channel processor or a Q channel processor for an antenna 1.

The channel processor is an I channel processor or a Q channel processor for an antenna 2.

The Doppler speed detector judges a traveling speed of the terminal by counting variation of a channel phase distortion value for 2T and adaptively controls the cumulative interval from minimum 2T to maximum 6T according to the traveling speed of the terminal.

The Doppler speed detector controls the cumulative interval as a multiple of 2T when a traveling speed of the terminal is slow and controls the cumulative interval as 2T when a traveling speed of the terminal is fast.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a flow chart illustrating a channel compensating method for a mobile communication terminal in accordance with the present invention.

DETAILED DESCRIPTION OF PREFERRED EMBODIMENTS

Figure 1:
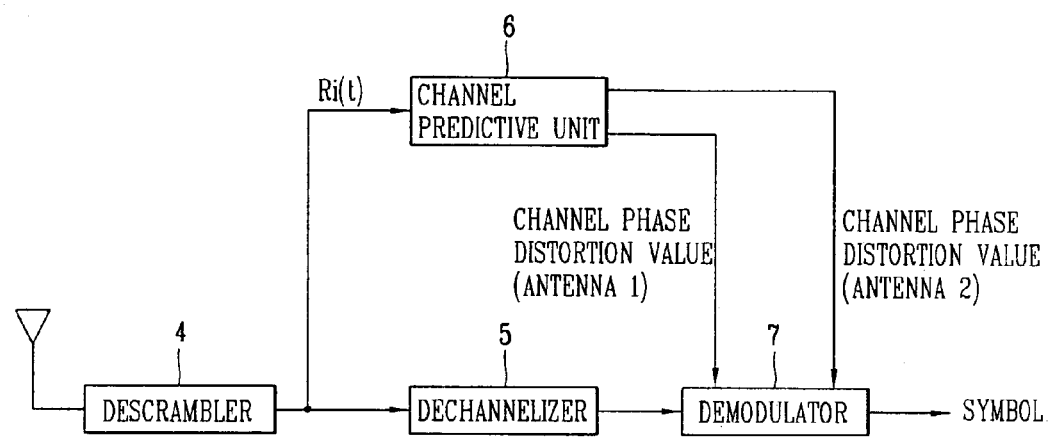
FIG. 1 is a block diagram illustrating a conventional channel compensating apparatus for a mobile communication terminal.
Figure 2:
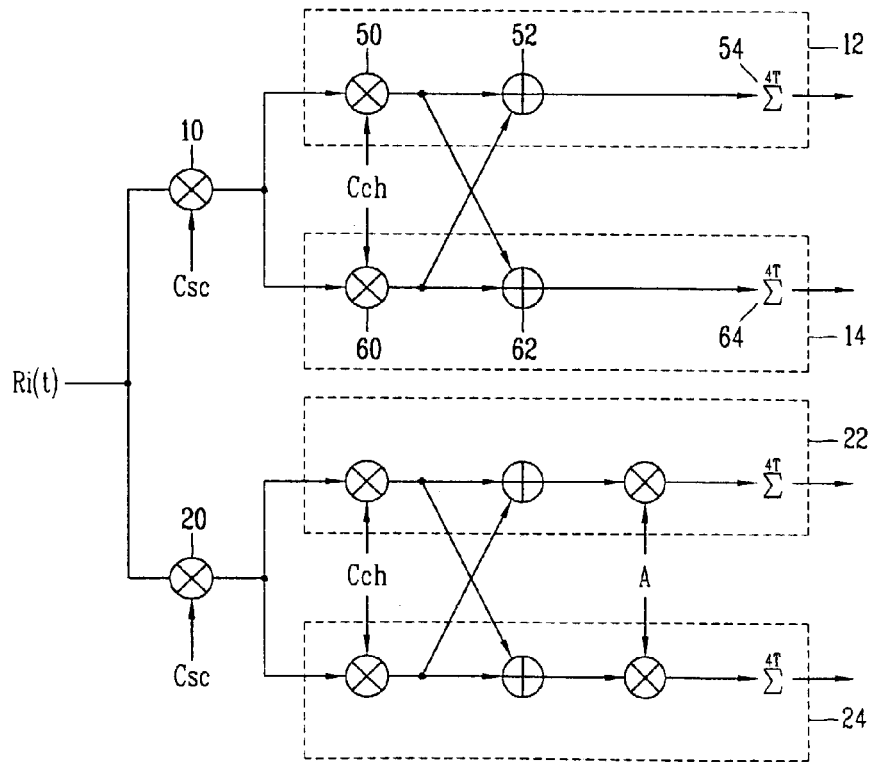
FIG. 2 illustrates a channel predictive unit of the channel compensating apparatus in FIG. 1.
Figure 3:
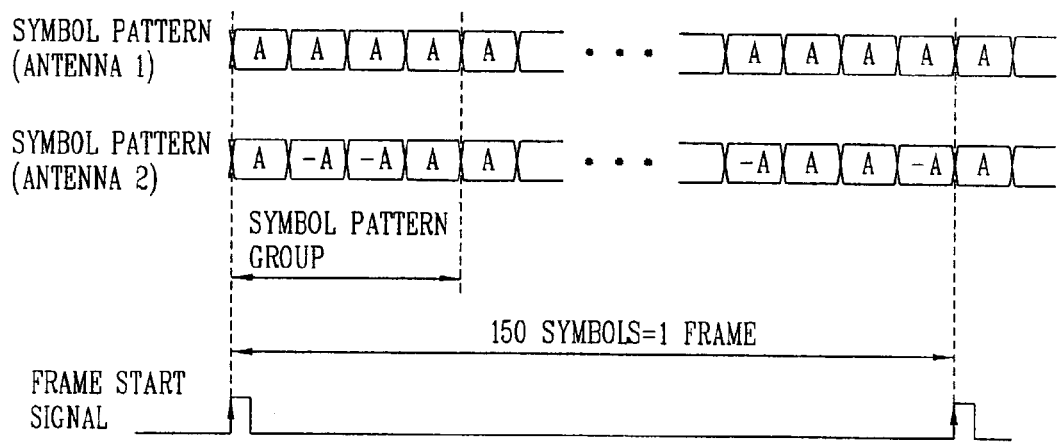
FIG. 3 illustrates a symbol pattern of an antenna 1 and an antenna 2.
Figure 4:
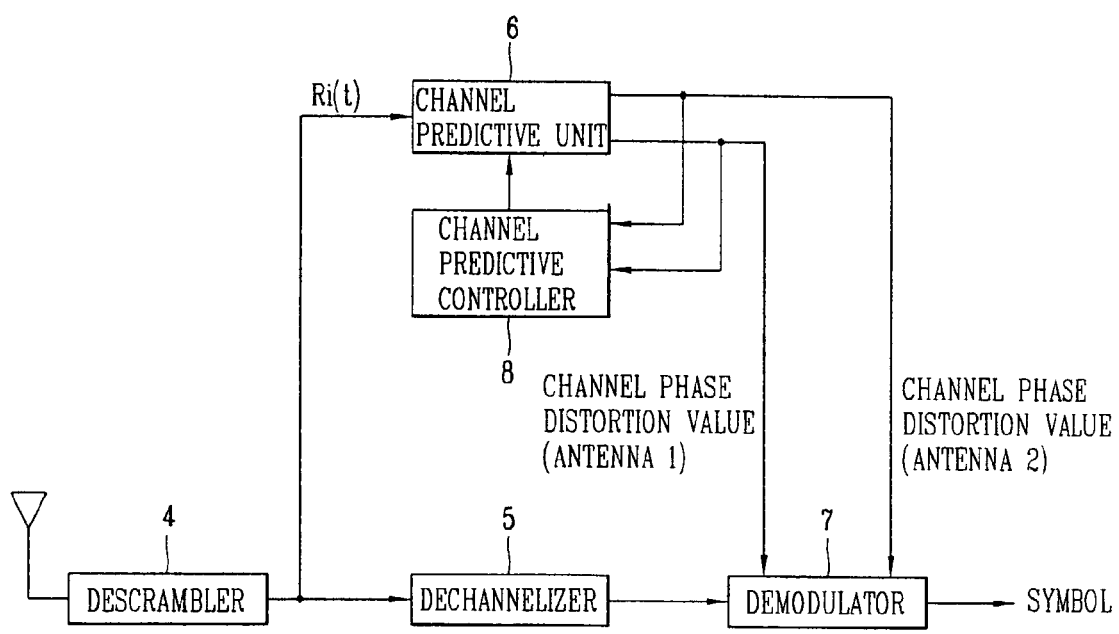
FIG. 4 is a block diagram illustrating a channel compensating apparatus for a mobile communication terminal in accordance with the present invention.

FIG. 4 is a block diagram illustrating a channel compensating apparatus for a mobile communication terminal in accordance with one embodiment of the present invention. In addition to same of the parts of the conventional channel compensating apparatus shown in FIG. 1, the channel compensating apparatus in accordance with the present invention further includes a channel predictive controller 8, which and the same construction parts with the conventional art will have the same reference numerals.

The channel predictive controller 8 which counts variation of a channel prediction value of an antenna 1 and an antenna 2 output from a channel predictive unit for a certain time and outputs a control signal for varying an energy cumulative interval to the channel predictive unit in response to the variation of a radio channel.

The operation of the channel compensating apparatus for the mobile communication terminal in accordance with the present invention will now be described. The channel predictive unit 6 calculates a moving average for an output signal of a descrambler 4 for a cumulative interval (2T) and outputs a channel prediction value for antenna 1 and antenna 2. The channel predictive controller 8 counts the channel prediction value for antenna 1 and antenna 2 for a certain time, and the channel predictive unit 6 outputs a control signal for varying the cumulative interval (2T).

More specifically, the channel predictive controller 8 counts the variation in the channel prediction value for the cumulative interval (2T), when a count value is less than a certain reference value. That is, when variation of the radio channel is small, the channel predictive controller outputs a control signal for lengthening a cumulative interval (maximum 6T) of the channel predictive unit. When the count value is large, that is, when variation of the radio channel is large, the channel predictive controller outputs a control signal for shortening a cumulative interval (minimum 2T) of the channel predictive unit.

Thus, the channel predictive unit outputs a channel prediction value corresponding to variation of the radio channel by adjusting the energy cumulative interval from minimum 2T to maximum 6T based on the control signal output from the channel predictive controller. And, on the basis of that, demodulator 7 compensates for phase distortion (channel path distortion) of the output signal of a dechannelizer 5.

Figure 5:
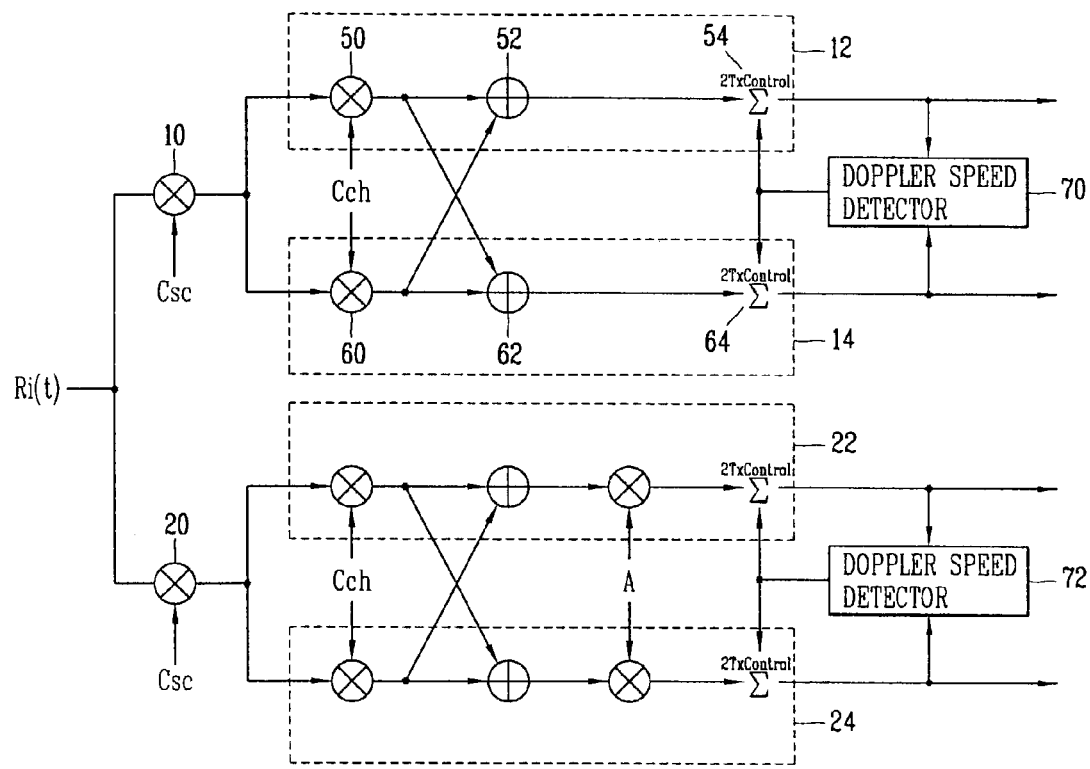
FIG. 5 illustrates an embodiment of a channel predictive controller of the channel compensating apparatus in FIG. 4.

FIG. 5 illustrates an embodiment of a channel predictive controller of the channel compensating apparatus in FIG. 4. As depicted, the channel predictive controller includes two Doppler speed detectors 70, 72 for antennas 1 and 2 respectively and compensates a channel prediction value based on a traveling speed of a terminal.

The Doppler speed detector 70 controls the cumulative interval of accumulators 54, 64 of the I-channel and Q-channel processors 12, 14 of antenna 1, and Doppler speed detector 72 controls the cumulative interval of accumulators of the I-channel and Q-channel processors 22, 24 of antenna 2. For purposes of convenience, only operation of the I-channel and Q-channel processors 12, 14 of antenna 1 and the Doppler speed detector 70 will be described.

As depicted in FIGS. 5 and 6, when a transmission signal is received through fingers (Ri, R are fingers) as shown at step S10, the received signal is divided into an I signal and a Q signal in a mixer 10, and the divided I signal and Q signal are respectively transmitted to the I channel processor 12 and the Q channel processor 14.

When the I signal and the Q signal are received, mixers 50, 60 of the I and Q channel processors 12, 14 divide the signals into channels by multiplying the I and Q signals respectively, by a channelizing code (Cch). Adders 52, 62 respectively separate channels having the same phase from the channelized signals.

The accumulators 54, 64 respectively calculate a moving average by accumulating the output signals of the adders 52, 62 for 2T (T: 1 symbol cycle) and output a channel prediction value (amplitude and phase distortion value) for the I and Q channels of the antenna 1, as shown at step S12. Herein, the Doppler speed detector 70 counts the channel prediction value output from the accumulators 54, 64 for 2T and detects a traveling speed of the terminal, as shown at step S14.

When the count value is less than a certain reference value, that is, when the traveling speed of the terminal is slow, a control signal for lengthening the energy cumulative interval (multiple of 2T, maximum 6T) is output to the accumulators 54, 64. When the count value is great, that is, the traveling speed of the terminal is fast, a control signal for shortening the energy cumulative interval (minimum 2T) is outputted to the accumulators 54, 64 as shown at steps S16–S20.

The accumulators 54, 64 output a channel prediction value corresponding to the variation of the radio channel by adjusting the energy cumulative interval from a minimum 2T to a maximum 6T according to the control signal outputted from the Doppler speed detector 70. More specifically, in the conventional art because an energy cumulative interval is fixed as 4T, it is difficult to respond to a traveling speed of a terminal appropriately. However, in the present invention, by adjusting a cumulative interval from a minimum 2T to a maximum 6T based on a traveling speed of a terminal, it is possible to respond to variations of a radio channel appropriately.

And, as depicted in FIG. 5, in the present invention the Doppler speed detectors 70, 72 are respectively constructed as an outer packaging of the channel predictive unit 6. In more detail, when the Doppler speed detectors 70, 72 are built in the channel predictive unit 6, the same advantages may be obtained.

As described-above, in the present invention, by calculating a channel prediction value by varying an energy cumulative interval according to a channel variation occurred in a radio channel, it is possible to reduce channel prediction error, and accordingly a channel compensation can be performed more accurately. In particular, in the conventional art, because an energy cumulative interval is fixed at 4T, it is impossible to response to a traveling speed of a terminal appropriately, however, in the present invention, by adjusting an energy cumulative interval from a minimum 2T to a maximum 6T based on a traveling speed of a terminal, it is possible to perform a channel prediction more accurately.

The present invention may be embodied in several forms without departing from the spirit or essential characteristics thereof. It should also be understood that the invention is not indeed to be limited by any of the foregoing embodiments, but rather should be construed broadly within its spirit and scope as defined in the appended claims. Thus, modifications to the foregoing embodiments may be preformed. For example, while the values of 2T to 6T have been described as values corresponding to the energy cumulative interval for a preferred embodiment of the invention, other values may be used if desired. Consistent with the foregoing description, it is emphasized that the energy cumulative interval used in accordance with the invention may be values other than the fixed 4T value used by conventional method.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for performing channel compensation in a mobile communications terminal, comprising:
   descrambling a received signal;
   dividing the descrambled signal by channels;
   calculating a channel prediction value based on the descrambled signal;
   detecting variation of a radio channel based on the calculated channel prediction value;
   compensating the channel prediction value based on the detected variation of the radio channel; and
   compensating the signal divided by channels using the compensated channel prediction value, wherein compensating the channel prediction value includes adjusting an energy cumulative interval for calculating the channel prediction value based on the detected variation of the radio channel.

2. The method of claim 1, wherein the channel prediction value compensating step includes:
   counting a variation of the channel prediction value for a certain time;
   checking whether a value corresponding to the counted variation is less than a reference value;
   lengthening the energy cumulative interval for calculating the channel prediction value when the count value is less than the reference value, and shortening the energy cumulative interval for calculating the channel prediction value when the count value is greater than the reference value.

3. The method of claim 2, wherein the energy cumulative interval is set as a multiple of 2T when the count value is less than the reference value, and the energy cumulative interval is set as 2T when the count value is greater than the reference value, wherein the T is 1 symbol cycle.

4. The method of claim 3, wherein the energy cumulative interval is set a as maximum 6T when the count value is less than the reference value.

5. The method of claim 1, wherein adjusting includes changing the energy cumulative interval from a first number of symbol cycles to a second number of symbol cycles.

6. The method of claim 5, wherein the first number of symbol cycles is greater than the second number of symbol cycles when the detected variation is above a reference value.

7. The method of claim 5, wherein the first number of symbol cycles is less than the second number of symbol cycles when the detected variation is below a reference value.

8. The method of claim 1, wherein calculating the channel prediction value includes computing a moving average for an output signal of a descrambler which descrambles the received signal.

9. The method of claim 8, wherein the moving average is computed by accumulating output signals from adders in I and Q channel processors coupled to receive the received signal, the output signals being accumulated over the energy cumulative interval.

10. A method for performing channel compensation in a mobile communication terminal, comprising:
    receiving a transmission signal;
    converting the transmission signal into a channel signal;
    computing a moving average of the channel signal for a certain cumulative interval and calculating a channel prediction value;
    detecting a traveling speed of a terminal based on the calculated channel prediction value; and
    varying the cumulative interval based on the detected traveling speed of the terminal, wherein the cumulative interval is adaptively set from a minimum 2T to a maximum 6T based on a traveling speed of the terminal, where T is 1 symbol cycle.

11. The method of claim 10, wherein the cumulative interval is set as a multiple of 2T when a traveling speed of the terminal is slow, and the cumulative interval is set as 2T when a traveling speed of the terminal is fast.

12. An apparatus for performing channel compensation in a mobile communication terminal, comprising:
    a reverse-channelizer for dividing a descrambled received signal by channels; a channel predictive unit for calculating a channel prediction value based on the descrambled received signal;
    a channel predictive controller for detecting variation of a radio channel based on the calculated channel prediction value and compensating the channel prediction value based on the detected variation of the radio channel; and
    a demodulator for compensating channel path distortion for the signal divided by channels using the channel prediction value outputted from the channel predictive unit, wherein the channel predictive controller compensates the channel prediction value by adjusting an energy cumulative interval for calculating the channel prediction value based on the detected variation of the radio channel.

13. The apparatus of claim 12, wherein the channel predictive controller counts the variation of the radio channel for the energy cumulative interval and controls the energy cumulative interval for calculating the channel prediction value in the channel predictive unit.

14. The apparatus of claim 13, wherein the energy cumulative interval is 2T, where T is 1 symbol cycle.

15. The apparatus of claim 12, wherein the channel predictive controller shortens the energy cumulative interval when the count value is greater than a reference value and lengthens the energy cumulative interval when the count value is less than the reference value.

16. The apparatus of claim 15, wherein the cumulative interval is set as a multiple of 2T when a traveling speed of the terminal is slow, and the cumulative interval is set as 2T when a traveling speed of the terminal is fast.

17. The apparatus of claim 12, wherein the channel predictive controller changes the energy cumulative interval from a first number of symbol cycles to a second number of symbol cycles.

18. The apparatus of claim 17, wherein the first number of symbol cycles is greater than the second number of symbol cycles when the detected variation is above a reference value.

19. The apparatus of claim 17, wherein the first number of symbol cycles is less than the second number of symbol cycles when the detected variation is below the reference value.

20. A channel predictive unit for a mobile communication terminal, comprising:
   a mixer for dividing a transmission signal into channel signals;
   a channel processor which generates a channel phase distortion value based upon a moving average of the divided channel signal for a certain cumulative interval; and
   a Doppler speed detector which detects a traveling speed of a terminal based on the channel phase distortion value of the channel processor and controls the cumulative interval based on the detected traveling speed, wherein the Doppler speed detector adaptively controls the cumulative interval from a minimum 2T to a maximum 6T based on a traveling speed of the terminal.

21. The channel predictive unit of claim 20, wherein the channel signal is an I signal or a Q signal.

22. The channel predictive unit of claim 20, wherein the channel processor is an I channel processor or a Q channel processor for a first antenna.

23. The channel predictive unit of claim 20, wherein the channel processor is included in a receiver finger.

24. The channel predictive unit of claim 20, wherein the channel processor is an I channel processor or a Q channel processor for an antenna 2.

25. The channel predictive unit of claim 20, wherein the Doppler speed detector detects a traveling speed of the terminal by counting variation of a channel phase distortion value for 2T.

26. The channel predictive unit of claim 20, wherein the Doppler speed detector controls the cumulative interval as a multiple of 2T when a traveling speed of the terminal is slow and controls the cumulative interval as 2T when a traveling speed of the terminal is fast.

* * * * *